United States Patent [19]
Notley et al.

[11] 3,786,433
[45] Jan. 15, 1974

[54] COMPUTER CONTROL ARRANGEMENTS

[75] Inventors: John Percy William Notley; James Simon Noble, both of Luton, England

[73] Assignee: George Kent Limited, Luton, England

[22] Filed: Sept. 25, 1972

[21] Appl. No.: 291,527

[30] Foreign Application Priority Data

Sept. 29, 1971 Great Britain .................... 45430/71

[52] U.S. Cl. ............................ 340/172.5, 340/146.1
[51] Int. Cl. ......................... G06f 15/16, G06f 15/46
[58] Field of Search ................. 340/172.5, 146.1 BE

[56] References Cited

UNITED STATES PATENTS

| | | | |
|---|---|---|---|
| 3,303,474 | 2/1967 | Moore | 340/172.5 |
| 3,377,623 | 4/1968 | Reut | 340/172.5 |
| 3,252,149 | 5/1966 | Weida | 340/172.5 |
| 3,409,877 | 11/1968 | Alterman | 340/146.1 BE X |
| 3,444,528 | 5/1969 | Lovell | 340/172.5 |
| 3,517,171 | 6/1970 | Avizienis | 340/172.5 X |
| 3,636,331 | 1/1972 | Amrehn | 340/172.5 X |

*Primary Examiner*—Paul J. Henon
*Assistant Examiner*—John P. Vandenburg
*Attorney*—Browdy & Neimark

[57] ABSTRACT

An electrical circuit for causing a computer to begin operating in accordance with a predetermined program. The circuit comprises a sequence signal generator and a store for a start address of the program. When an input signal is applied to the circuit, the sequence signal generator provides three output signals, a first signal for stopping the computer in the event that it is already operating in accordance with another program, a second signal for causing a start address of the predetermined program to be loaded into a memory address register of the computer, and a third signal for re-starting the computer. The circuit can be used in a dual computer system wherein malfunction of a normally on-line computer causes generation of an input signal for triggering the sequence signal generator to bring a normally off-line computer into operation. Alternatively, the circuit can be used for controlling a system having a single computer from a remote location.

12 Claims, 4 Drawing Figures

COMPUTER CONTROL ARRANGEMENTS

This invention relates to electrical circuit means for use in controlling computers.

According to the present invention an electrical circuit means for use in controlling a computer comprises input and output means, a sequence signal generator connected between the input and output means, and means for storing the start address of a predetermined computer program connected between an output of the sequence signal generator and the output means, the sequence signal generator being adapted, when a predetermined input signal is applied to the input means, to generate a set of output signals for sequentially stopping the computer in the event that it is already operating in accordance with another program, causing the said start address to be fed from the storing means to the output means for loading into a memory address register in the computer, and causing the computer to begin operating in accordance with the predetermined program.

The invention will now be described, by way of example, with reference to the accompanying drawings, in which.

Figure 1:
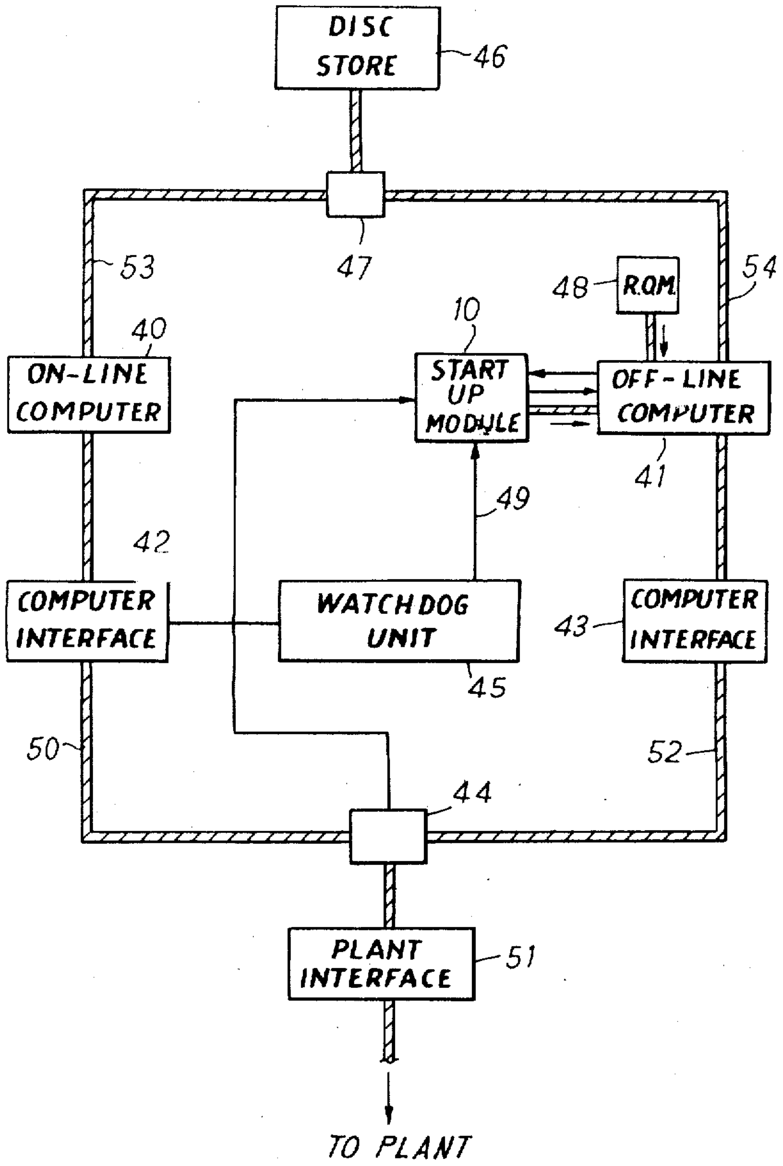
FIG. 1 shows schematically a first computer control system including an electrical circuit means according to the invention.

FIG. 1 of the drawings is a system for controlling the operation of a process in a chemical plant. The system includes two digital computers 40 and 41 of which computer 40 is normally "on-line," controlling the plant, and computer 41 is normally "off-line" and operating in accordance with some other program. The system is designed to stop computer 41 performing this other function and to switch this computer into control of the process in the event of a failure of computer 40.

Each of the computers 40 and 41 is a model PDP – 8/E computer supplied by Digital Equipment Corporation of Maynard, Mass., U.S.A. and is described in detail in the "PDP – 8/E Small Computer Handbook" published by that company. Within each computer there are the usual central processor, containing an arithmetic unit and a control section, an internal memory unit and a standard interface for connecting the central processor to peripheral units.

Referring to FIG. 1, a computer interface 42, which is coupled to the computer 40, serves to route output signals from the computer to other parts of the system and includes analogue digital converters for converting input signals to the computer into usable form. Thus, the interface 42 is first coupled via a data highway 50 to an electronic switch unit 44 which is in turn connected via an interface 51 to the chemical plant. The interface 51 connects devices in the chemical plant to the present system, where necessary changing the nature of signals from these devices into a form compatible with a digital system, and includes switching circuits for routing these signals and signals from the system to the plant.

As shown in FIG. 1, the off-line computer 41 is provided with a computer interface 43 which corresponds to the interface 42 and connects the computer 41 via a data highway 52 to the switch unit 44.

The standard interface in each of the computers 40 and 41 is coupled via a respective line 53 or 54 to an electronic switch 47, which in turn is connected to a disc store 46. Disc store 46 includes a 262 K word, fixed head disc store and a controller therefore. Under normal operating conditions the switch 47 connects the standard interface of the on-line computer 40 to the disc store 46. There is then stored on the disc store 46 a duplicate of the process control program in the internal memory unit of computer 40, up-to-date information concerning the condition of the process under control, fed to the store regularly from computer 40, and a "load from disc" program for use in transferring information in the store 46 to the off-line computer 41, as hereinafter described. In the event of a malfunction of computer 42 the switch 47 is operated, as hereinafter described, and the on-line computer 40 is disconnected from the store 46 and the off-line computer is connected to the store.

For detecting a malfunction of the computer 40 a watchdog unit 45 is regularly updated with pulses generated in computer 40 as a result of a sub-routine in the software of the computer and supplied to unit 45 via the interface 52. Watchdog unit 45 includes a monostable circuit which is adapted to provide output signals on an output line 49 in the event of a malfunction of computer 40 resulting in the absence of an up-dating signal. Output line 49 is connected to an input terminal of an automatic start-up module 10 which is coupled to the off-line computer 41. Module 10 is hereinafter described with reference to FIG. 2 of the drawings.

A "read-only" memory unit 48 is coupled to the central processor in the computer 41 and contains a "loader" or "bootstrap" program for use in transferring information in the disc store 46 to the internal memory unit in the central processor. Command signals for stopping the computer 41 from performing the alternative program mentioned above, causing the program stored in the unit 48 to be transferred to computer 41, and subsequently restarting the computer 41 are derived from the module 10, as hereinafter described. Module 10 is coupled to switch unit 44 via an inhibit line 55, as also hereinafter described.

Figure 2:
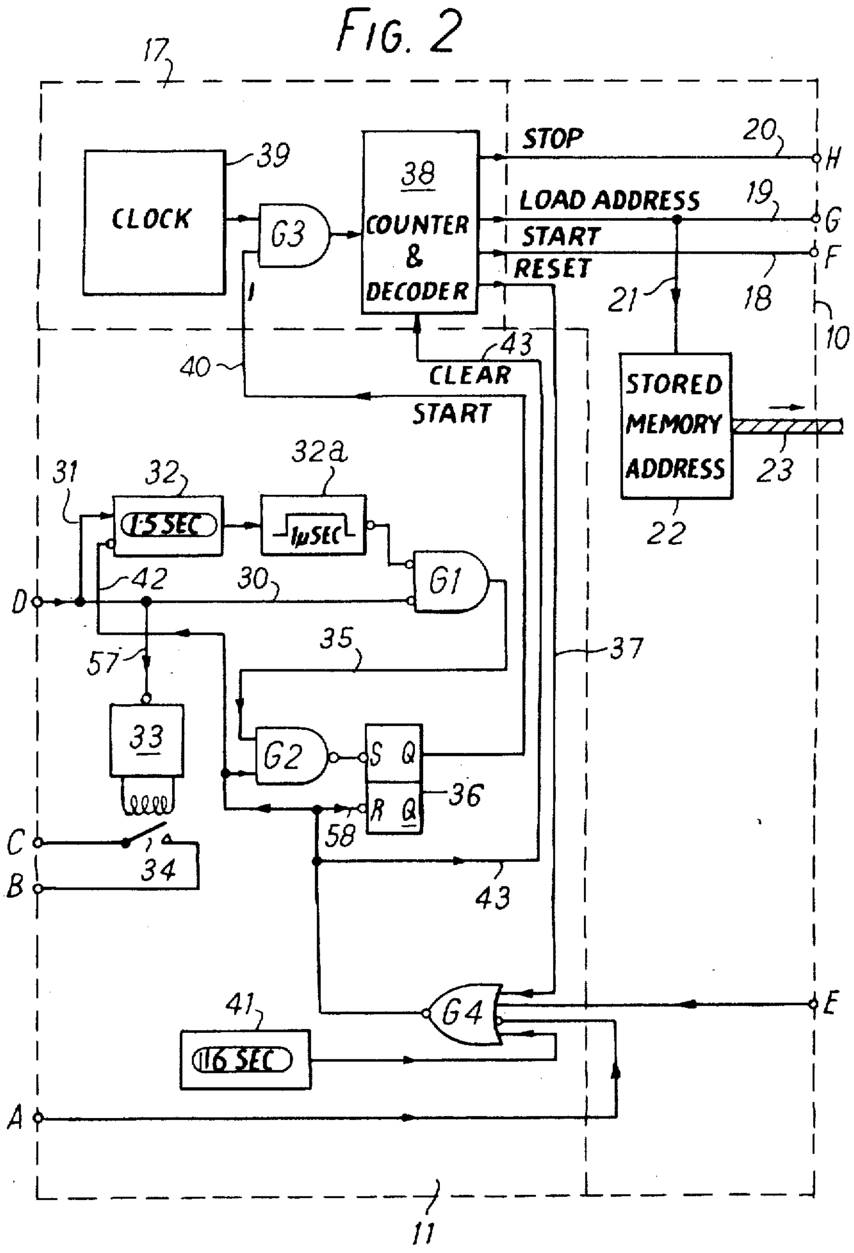
FIG. 2 is the electrical circuit means in the control system of FIG. 1.

Referring now to FIG. 2 of the drawings, the automatic start-up module 10 is made up of a sequence signal generator 17, a memory address store 22 and a logic circuit 11 for actuating the generator 17 and the store 22.

Connection between the module 10 and the watchdog unit 45 is effected via an input terminal D of the logic circuit 11. Within the module 10 terminal D is connected to a relay 33 via a line 57, to a first input of a gate G1 via a line 30, and to a second input of the gate G1 via a line 31, a delay circuit 31 and a pulse generator 32*a*.

The relay 33 has a set of contacts 34 which are connected between a pair of input terminals C and D of the logic circuit 11. Terminals C and D are connected to a unit for supplying power to operator controls on a front panel of the off-line computer 41. Connection between the contacts 34 and the power unit is such that power is supplied to the operator controls when the relay 33 is inoperative and the contacts 34 are closed. When the relay 33 is operated and the contacts 34 are opened, power is removed from the operator controls.

This prevents an operator from interfering with the subsequent operation of computer 41.

The gate G1 is a NOR gate whose output assumes a logic 1 state if a logic 0 condition is applied to each of its inputs. With a logic 1 state at either input the output of gate G1 assumes a logic 0 state.

The delay circuit 32, which is a monostable circuit, has one input connected to the line 31 and a second, re-set input connected to a line 42. Delay circuit 32 is operable as long as its re-set input is in a logic 1 state. In this case a short pulse is produced at the output of the circuit 1.5 seconds after the application of a logic 0 condition to the circuit via line 31. If the re-set input of the delay circuit 32 is switched to a logic 0 condition at any time during the 1.5 seconds, however, no output pulse is provided at the output of the circuit.

The pulse generator **32*a* generates a pulse of 1 microsecond duration at a logic level 0 whenever a short pulse is applied thereto from the output of the delay circuit 32**.

The output of gate G1 is connected via a line 35 to an input of a further gate G2, which has a second input connected to an output of a gate G4 and an output connected to a set input of a bistable circuit 36. Gate G2 is a NAND gate whose output assumes a logic 0 state if both inputs are in a logic 1 state but otherwise assumes a logic 1 state.

The gate G4 has four inputs as follows.

First, there is an input which is connected via a delay circuit 41 to a power supply for the module 10. The output of delay circuit 41 is in a logic 1 state when there is no power supplied to the module 10 and is switched to a logic 0 state 6 seconds after the application of power.

A second input of gate G4 is connected to an input terminal A to the logic circuit 11. Terminal A is an inhibit terminal which is connected via line 55 to switch unit 44 of FIG. 1 to prevent noise from computer 40 or interface 42 again triggering logic circuit 11 once changeover is complete.

A third input to gate G4 is connected to a further input terminal E which is connected to the main power supply for the off-line computer 41. A logic 0 condition is applied to terminal E as long as the computer 41 is switched on and has power supplied to the various circuits therein. If the computer 41 is switched off a logic 1 condition is applied to terminal E.

Finally a fourth input of the gate G4 is connected by a line 37 to a re-set output from the sequence signal generator 17, as hereinafter described.

The output of gate G4 is also connected via the line 42 to the re-set input of delay circuit 32, via a line 58 to a re-set input of bistable circuit 36 and via a line 43 to a 'clear' terminal in the sequence signal generator 17.

Gate G4 is a NOR gate whose output assumes a logic 0 sate if one or more of its first, third and fourth inputs are in a logic 1 sate or if its second input is in a logic 0 state. If the first, third and fourth inputs are all in a logic 0 state and the second input is in a logic 1 state the output of the gate G4 assumes a logic 1 state.

The bistable circuit 36 has a Q output which is connected via a line 40 to the sequence signal generator 17. This Q output is switched to a logic 1 state when a logic 0 condition is applied to the set input of the circuit from the output of gate G2. The Q output is switched to a logic 0 state if a logic 0 condition is applied to the re-set input of circuit 36 from the output of gate G4.

As shown in FIG. 2 the sequence signal generator 17 includes a clock 39 and a counter and decoder 38 which are coupled together by a gate G3.

The gate G3 is an AND gate whose output assumes a logic 1 state if both inputs thereto are in a logic 1 state. If one or both inputs are in a logic 0 state the output is in a logic 0 state. One input of gate G3 is connected to an output of the clock 39, a second input connected to the line 40 from bistable circuit 36, and an output connected to the counter and decoder 38.

The clock 39 is a self starting multivibrator which supplies pulses having a 1:1 mark to space ratio at a nominal frequency of 50KHz to the first input of gate G3.

Counter and decoder 38 includes a set of bistables so interconnected as to produce a binary count of the clock pulses applied to its input from clock 39. The bistables are coupled to four outputs of the generator 17 by a series of gates which form a decoder. These gates are so arranged that each output assumes a logic 1 state when the binary count has reached a predetermined number associated with its required output timing.

A first output of the generator 17 is connected to an output terminal H of the module 10 by a line 20. Terminal H is in turn connected to the timing chain in the off-line computer 41. A second output of generator 17 is connected to a terminal G of module 10 via a line 19 and is also connected to a memory address store 22 via a line 21. Terminal G is connected to a load address logic circuit in the computer 41. The store 22, which is a set of bistables in which a predetermined binary number is stored, is coupled via a data highway 23 to the memory address register in the computer 41. A third output of generator 17 is connected via a line 18 to a terminal F of module 10, terminal F being connected to the timing chain in the computer 41. Finally, the fourth output of the generator 17 is connected to the fourth input of gate G4 by the line 37 referred to above.

The counter and decoder 38 is also connected to the above mentioned line 43 from the output of gate G4. A logic 0 condition on the line 43 clears the counter in the counter and decoder 38.

In operation of the present control system the switches 44 and 47 are normally in a condition such that the computer 40 is on-line, as indicated above. The chemical plant is then operated in accordance with a process control program stored in the memory unit of the central processor in computer 40, control signals representing successive parts of the program being transmitted to the plant via computer interface 42, switch 44 and plant interface 51 and up-to-date data representing conditions in the plant being transmitted to the central processor in the reverse direction.

During this normal operation of the system a duplicate of the program stored in the computer 40 is also stored at a predetermined location in the disc store 46. Likewsie, up-to-date data from the plant is fed regularly via the central interface in computer 40 to a further area in the disc store 46. Finally, the above-mentioned "load-from-disc" program is also stored in the disc store 46.

During normal operation of the system the off-line computer 41 is disconnected from the plant and from the disc store 46. Computer 41 is switched on, however, and is usually operating in accordance with some further program stored in its memory unit and not connected with operation of the plant.

Throughout normal operation of computer 40 a series of updating pulses are fed from computer 40 to the watchdog unit 45 via the computer interface 42. The output line 49 from the watchdog unit 45 is then in a logic 1 state. Assuming that there is now some malfunction in computer 40 the pulses to watchdog unit 45 are cut off and the output line 49 is switched to the logic 0 state.

The logic 0 state at the output of watchdog unit 45 is applied to input terminal D of the automatic start-up module 10.

Within unit 10 the logic D state is applied to relay 33, energising the relay and causing contacts 34 to open. This disconnects the controls on the front panel of computer 41 from the power unit therefor, thus preventing an operator from interfering with the subsequent operation of this computer.

The logic 0 state is also applied to the first input of the gate G1 and to the first input of delay circuit 32. Delay circuit 32 serves to prevent the computer 41 from being brought on-line in the event that there is merely an apparent fleeting failure of computer 40 caused by noise. This causes a logic 0 state to appear at the output of watchdog unit 45 for less than 1.5 seconds. Assuming that there is a genuine failure of computer 40 so that the logic 0 state persists for more than 1.5 seconds, and assuming that the re-set input of delay circuit 32 is at logic level 1, a short voltage pulse appears at the output of delay circuit 32 at the end of this period. As described above, this results in the application of a 1 microsecond pulse at a logic level 0 to the second input of gate G1. The output of gate G1 is then switched to a logic 1 condition, and this condition is applied to the first input of gate G2.

As indicated above, the second input of gate G2 is connected to the output of gate G4, which has four inputs. Assuming that power has been supplied to the module 10 for at least 6 seconds the first input of gate G4, which is connected to the output of delay circuit 41, is at a logic level 0. The second input of gate G4 is at logic level 1 until a changeover from computer 40 to computer 41 is complete. The unit 44 then generates a signal on line 55 which switches terminal A to the logic 0 level. The third input of gate G4, which is connected to terminal E, is at a logic level 0 if power is switched on in the off-line computer 41. The fourth input of gate G4 is at a logic 0 level if the counter and decoder 38 is in a reset condition. If all of these conditions are fulfilled so that it is in order for the off-line computer 41 to be brought on-line, the output of gate G4 is at a logic level 1. It will be noted that this was the condition assumed for operation of the delay circuit 32.

With both inputs to gate G2 at a logic level 1 the output of the gate is switched to a logic level 0. This logic level is applied to the set input of the bistable circuit 36, causing the Q output of the bistable to be switched to a logic 1 state. The gate G3, which has one input thereof connected to this Q output, is then able to gate positive pulses from the clock 39 to the counter and decoder 38. As indicated above, pulses from the clock 39 are counted in the counter and decoder 38 and command signals are sequentially provided on the four outputs of this circuit.

The first command signal in the sequence of signals for counter and decoder 38 is a STOP signal which appears at the output connected to line 20 and is applied via terminal H to the timing chain in the computer 41. This STOP signal stops the computer from operating in accordance with the program stored in its memory unit. This program is lost but power remains applied to all units in the computer.

The second command signal from counter and decoder 38 is a LOAD ADDRESS signal which is transmitted along line 19 to the output terminal G and along line 21 to the memory address store 22. The application of the LOAD ADDRESS signal to store 22 enables the store to transfer the binary number stored therein over the highway 23 to the memory address register in the central processor in computer 41. At the same time the LOAD ADDRESS signal is applied via terminal G to the memory address register itself, enabling the register to receive the binary number from store 22. When the computer 41 is restarted it will therefore automatically start operating the program whose start address is stored at a location represented by the binary number from the store 22. It will be appreciated that the LOAD ADDRESS signal can be operated simultaneously with, or shortly after, the generation of the STOP signal.

The third command signal from the counter and decoder 38 is a START signal which is generated an interval of time after the STOP signal which is at least equal to the time taken by computer 40 to implement the longest instruction time of the computer, i.e., the period of time necessary for the computer to implement the most involved instruction applied thereto. This third signal is applied via terminal F to the timing chain in the computer 41 and causes the computer to start up and to begin operating the program whose start address is represented by the binary number from memory address 22.

The fourth command signal from counter and decoder 38 is the above-mentioned re-set signal which is applied to the fourth input of gate G4 in the module 10. Application of this re-set signal to the gate 4 causes the output of the gate to be switched to a logic level 0 for the duration of the signal. This re-sets the bistable circuit 36 and clears the counter in the counter and decoder 38.

Once the START signal has been received by computer 41 the computer begins to operate in accordance with the program whose start address is stored at a location represented by the binary number from the memory address store 22. This program is in fact the "loader" or "bootstrap" program stored in the read-only memory unit 48.

Operation of the "loader" program first causes computer 41 to generate a signal which operates the switch unit 47 to connect computer 41 to the disc store 46 and to disconnect computer 40, then causes the computer 41 to call down a program stored at a predetermined location in the disc store 46, the above-mentioned "load-from-disc" program, then to jump into this load-from-disc program, causing the process control program and process control data stored elsewhere in the store 46 to be transferred to the memory unit of computer 41, and finally to jump to the start address of the process control program. The computer 41 now operates switch unit 44, assumes control of the plant, and begins to operate in accordance with the process control program and data obtained from the disc store 46.

Once the fault is computer 40 has been corrected computers 40 and 41 are normally switched to the "on-line" and "off-line" conditions respectively. This is effected by manually running a program in computer 40 to call down to this computer the process control program and data from disc store 46.

It will be appreciated that the "loader" program in unit 48 is very short since this unit must occupy as little space as possible. The "loader" program is used to call down a more comprehensive "load from disc" program from the disc store 46, this "load from disc" program being capable of transferring the complete process control program and data from the store.

The disc store 46 can be replaced by a drum store or other memory device.

Figure 3:
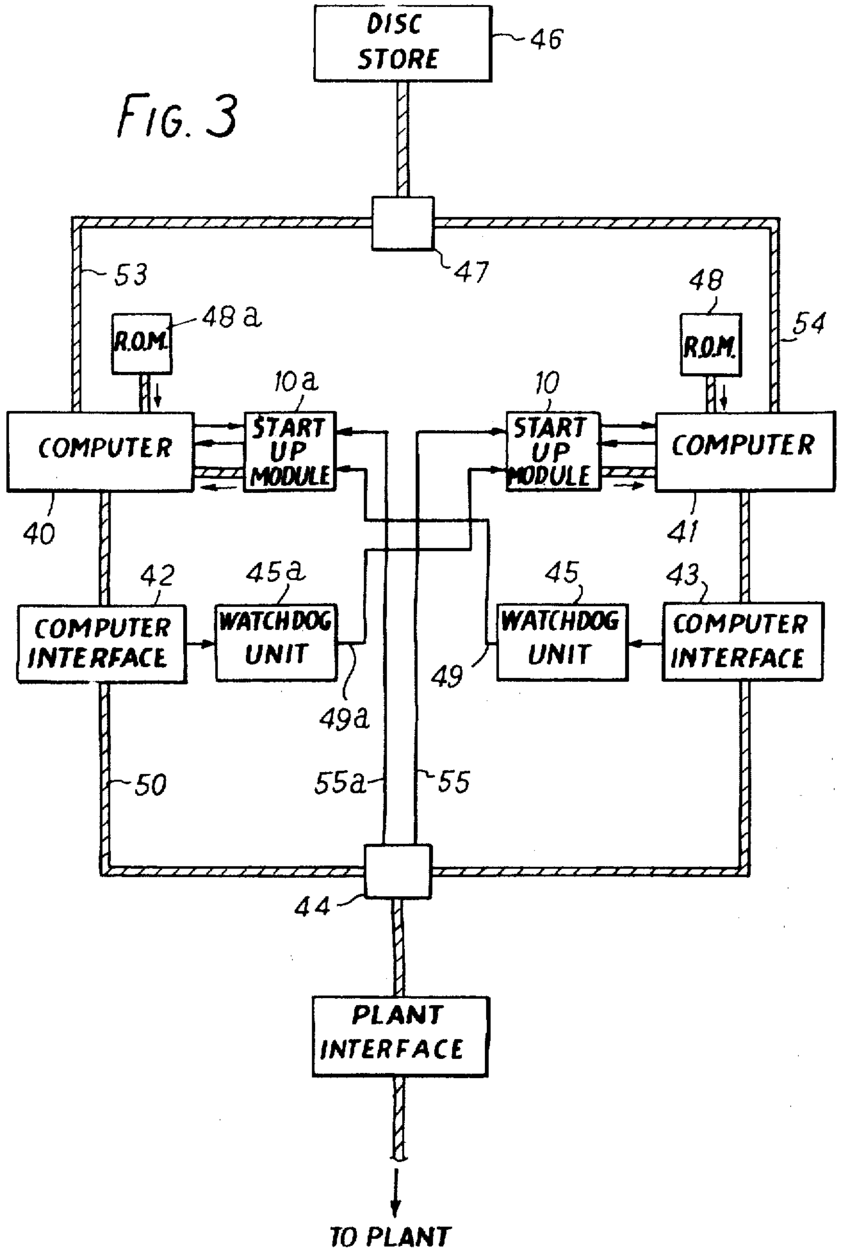
FIG. 3 is a second control system including electrical circuit means according to the invention.

Referring now to FIG. 3 of the drawings, a second control system according to the invention also includes two digital computers of which one is "on-line" and the other "off-line" at all times. Once a computer in the present system is "on-line," however, it remains "on-line" until it suffers from a breakdown, whereupon the other computer is switched into the "on-line" condition. The present system is therefore symmetrical with respect to the two computers, neither being regarded as normally off-line or on-line and no provision being made for manually switching one of the computers to the on-line condition as soon as any fault therein has been corrected.

In FIG. 3 of the drawings items corresponding to items in FIG. 1 are identified by the same reference number as used in FIG. 1.

Referring to FIG. 3 each computer 40 and 41 is again coupled to the plant interface 51 via an interface 42 or 43 and the switch unit 44. Each computer 40 and 41 is also coupled to a disc store 46 via the switch unit 47. For detecting a malfunction of computer 40 there is again provided a watchdog unit 45 which triggers an automatic start up module 10 associated with computer 41. A memory unit 48 is again associated with computer 41. These units operate in the manner described above in connection with FIG. 1.

In the present system there is additionally provided a watchdog unit 45a which is coupled to the interface 43 and is adapted to detect a malfunction of computer 41. Associated with computer 40 is an automatic start up module 10*a* of the same construction as module 10 and a memory unit 48*a* of the same construction as memory unit 48. Watchdog unit 45*a* is coupled to the module 10*a* to trigger this unit in the event of a malfunction of computer 41, in the manner described above for watchdog unit 45 and computer 40.

The units 45*a*, 10*a* and 56*a* operate to bring computer 41 into the "off-line" condition and computer 40 into the "on-line" condition in the same manner as units 45, 10, 48 and 56 perform the reverse operation.

Figure 4:
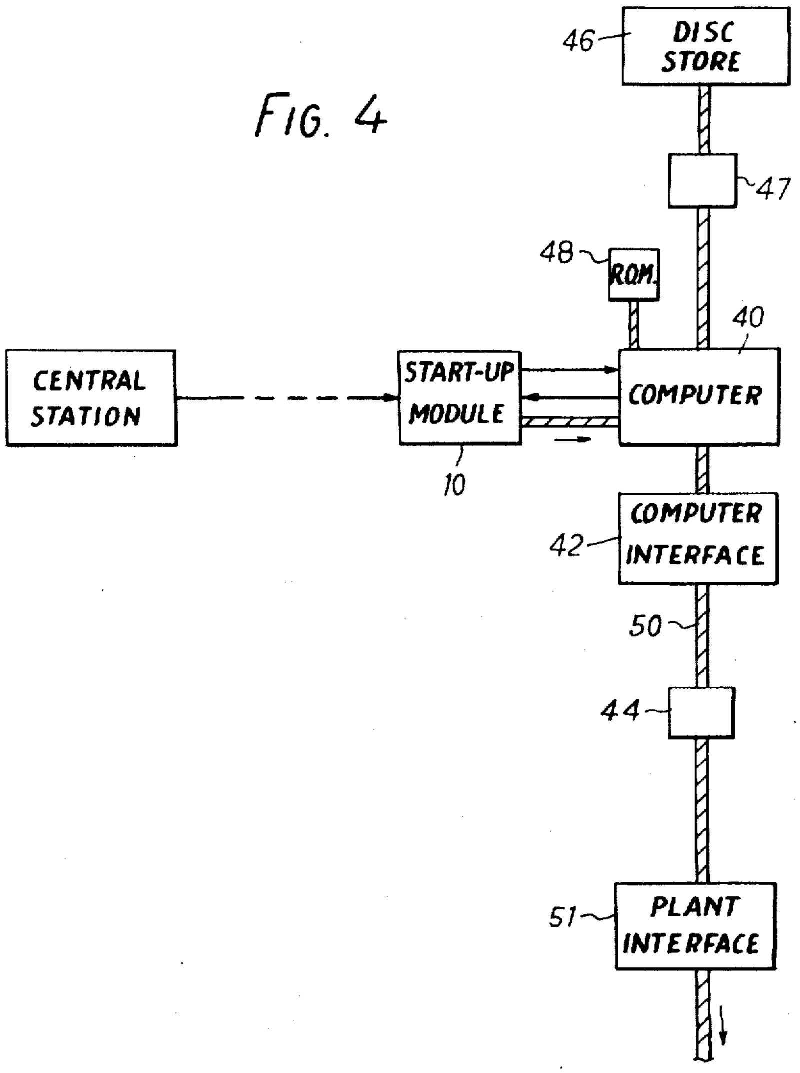
FIG. 4 is a third control system including electrical circuit means according to the invention.

Referring now to FIG. 4 of the drawings, a further control system according to the invention is designed to enable an operator at a central station to switch a computer at a remote location into an "on-line" condition wherein the computer is controlling operation of a chemical process plant. The computer may previously be inoperative though with power applied thereto, or it may be operating in accordance with some other program.

In FIG. 4 items corresponding to items in FIG. 1 are identified by the same reference number as used in FIG. 4.

Thus, referring to FIG. 4, a computer 40 at the remote location is coupled via an interface 42 and a switch unit 44 to a plant interface 51 at the chemical plant. Computer 40 is also coupled via a switch 47 to an external disc store 46 which contains a process control program for use in operating the plant.

For use in switching the computer 40 into an on-line condition an automatic start-up module 10 and a memory unit 48 are again provided.

In the present system the input to the module 10 is connected via a data link to a control unit at a central station 60. When the computer 40 is off-line it may be performing some alternative program not connected with the chemical plant. To bring the computer on-line a predetermined signal is transmitted via the data link to the input of the module 10, whereupon the above-described series of operations is effected to switch the computer 40 on-line.

It will be appreciated that the computer systems described above can be used in other applications, e.g., in operating a traffic control system.

We claim:

1. Electrical circuit means for use in controlling a computer having a memory address register, upon receipt of a predetermined input signal, comprising:

first input means for receiving the predetermined input signal;

output means for loading an address into the memory address register of the computer;

storage means for storing the start address of a predetermined computer program; and a sequence signal generator means connected to said first input means, output means and storage means for generating a series of output signals when the predetermined input signal is received by said first input means for sequentially (1) stopping the computer in the event that it is already operating in accordance with another program, (2) causing said stored start address to be fed from said storing means to said output means, and (3) causing the computer to begin operating in accordance with said predetermined program.

2. Electrical circuit means as claimed in claim 1, wherein the sequence signal generator means generates a first output signal for stopping the computer, a second output signal which is applied to said output means for enabling the memory address register in the computer to accept said start address and is also applied to said storing means to cause said start address to be fed to said output means, and a third output signal for causing the computer to begin operating in accordance with said predetermined program.

3. Electrical circuit means as claimed in claim 2, wherein said second output signal is generated shortly after the first output signal and said third signal is generated an interval of time after said first output signal which is at least equal to the longest instruction time of the computer.

4. Electrical circuit means as claimed in claim 1, further including a logic circuit means, connected between said sequence signal generator means and said first input means, for preventing the generation of said output signals if said predetermined input signal is applied to the said input means for less than a predetermined interval of time.

5. Electrical circuit means as claimed in claim 1, further including a logic circuit means including a second input means connected, in use, to the computer or to a unit associated therewith, for preventing the generation of said output signals unless a check signal, representing that the computer or associated unit is in a condition suitable for loading said start address, has been applied thereto, said logic circuit means being connected between said first input means and said sequence signal generator means.

6. Electrical circuit means as claimed in claim 1, wherein said sequence signal generator means includes means for generating a train of pulses, a counter for counting the pulses generated by said generating means, and decoder means coupling the counter to the said output means for providing said output signals at said output means when the count reaches predetermined values respectively associated with said output signals.

7. A computer system utilizing the electrical circuit means of claim 1 comprising a computer, first switch means for coupling said computer to a chemical plant or the like which is to be controlled thereby, a first external store for a control program for controlling operation of the plant, said electrical circuit means, the output means of said electrical circuit means being connected to said computer, and a second store for said predetermined program, said predetermined program serving as a loading program for initiating the loading of said control program into said computer from said external store;

whereby application of said predetermined signal to said electrical circuit means causes said sequence signal generator to generate said output signals, whereupon said computer operates according to said loading program, the control program is loaded into the computer, and the computer is then able to control the plant or the like according to said control program upon operation of said first switch means to couple said computer to the plant or the like.

8. A computer system utilizing the electrical circuit means in claim 1 comprising two computers, first switch means for selectively coupling the computers to a chemical plant or the like which is to be controlled thereby, one of the computers being normally on-line and coupled to the plant and the other being normally off-line, a common store for a program for controlling the plant and for up-to-date information concerning the plant which is fed to said common store from said on-line computer, second switch means for selectively coupling said computers to said common store, said electrical circuit means, the output means of said electrical circuit means being connected to said off-line computer, a first malfunction detector having an input connected to said on-line computer, an output connected to said first input means of said electrical circuit means for providing said predetermined input signal at said first input means of said electrical circuit means when there is a malfunction of said on-line computer, a store for said predetermined program, said store being connected to said off-line computer and said predetermined program serving as a loading program for initiating the loading of said control program and said up-to-date information concerning the plant from said external store into said off-line computer;

whereby a malfunction of said on-line computer causes said predetermined input signal to be applied to said off-line computer from said first malfunction detector, said sequence signal generator means to generate said output signals, and said loading program to be loaded into said off-line computer, whereupon the operation of said loading program causes the operation of said first switch means to couple said off-line computer to said external store, loading of said control program and said up-to-date information into said off-line computer, and said second switch means are then operated to couple the off-line computer to the system.

9. A computer system as claimed in claim 8, wherein said on-line computer is also provided with said electrical circuit means and an external store, and a second malfunction detector connecting said off-line computer to said first input means of said electrical circuit means associated with said on-line computer, whereby malfunction of said normally off-line computer, after it has been switched into control of the plant, causes return switching of said normally on-line computer into control of the plant.

10. A computer system as claimed in claim 8, wherein said common store contains a load-from-common store program, whereby operation of said loading program causes said load-from-common store program to be loaded into said normally off-line computer, and operation of said load-from-common store program causes said control program and up-to-date information to be loaded into said off-line computer.

11. A computer system as claimed in claim 8, wherein said external store is a read-only memory unit.

12. A computer system as claimed in claim 8, wherein said common store is a disc store.

* * * * *